US012119636B2

(12) United States Patent
Fan et al.

(10) Patent No.: US 12,119,636 B2
(45) Date of Patent: Oct. 15, 2024

(54) TEST-BOOST ELECTRIC POWER RECLOSER

(71) Applicant: Southern States, LLC, Hampton, GA (US)

(72) Inventors: Jiyuan Fan, Duluth, GA (US); Hua Fan, Cumming, GA (US); Tan Tran, Morrow, GA (US); Joseph R. Rostron, McDonough, GA (US); Paul A Reneau, Lagrange, GA (US)

(73) Assignee: SOUTHERN STATES, LLC, Hampton, GA (US)

(*) Notice: Subject to any disclaimer, the term of this patent is extended or adjusted under 35 U.S.C. 154(b) by 239 days.

(21) Appl. No.: 17/746,416

(22) Filed: May 17, 2022

(65) Prior Publication Data

US 2023/0023693 A1    Jan. 26, 2023

Related U.S. Application Data

(60) Provisional application No. 63/224,448, filed on Jul. 22, 2021.

(51) Int. Cl.
*H02H 7/26* (2006.01)
*H02H 1/00* (2006.01)
*H02H 3/06* (2006.01)
*H02H 3/07* (2006.01)

(52) U.S. Cl.
CPC .......... *H02H 3/066* (2013.01); *H02H 1/0007* (2013.01); *H02H 3/07* (2013.01); *H02H 7/26* (2013.01)

(58) Field of Classification Search
USPC ....................................................... 700/273
See application file for complete search history.

(56) References Cited

U.S. PATENT DOCUMENTS

| 7,626,397 B2 | 12/2009 | Opfer et al. |
| 8,744,637 B1 * | 6/2014 | Maragal ................. H02H 3/066 |
| | | 702/77 |
| 2008/0024142 A1 * | 1/2008 | Opfer ..................... H01H 75/04 |
| | | 324/555 |
| 2009/0088988 A1 * | 4/2009 | Muthu-Mannivannan ................ |
| | | G01R 31/1227 |
| | | 702/58 |

(Continued)

*Primary Examiner* — Emilio J Saavedra
(74) *Attorney, Agent, or Firm* — Mehrman Law Office; Michael J. Mehrman

(57) ABSTRACT

Embodiments of the present invention include a test-boost electric power recloser that limits the duration of the test current imposed on the power line to less than two electric power cycles, and preferably less than one electric power cycle, when attempting to reclose into a fault. The test-boost recloser sends a test pulse causing a non-latching close followed by a boost pulse causing a latching close if waveform analysis based on the test close indicates that the fault has likely cleared. The test-boost approach can typically be implemented through a software and calibration upgrade to a conventional single-coil recloser, accomplishing results comparable to a dual-actuator recloser at a much lower cost. The recloser may perform iterative and feedback learning feedback processes to automatically improve its operation over time in response to measured fault and non-fault conditions and its success in predicting whether faults have cleared.

20 Claims, 9 Drawing Sheets

(56) References Cited

U.S. PATENT DOCUMENTS

| | | | |
|---|---|---|---|
| 2010/0014198 A1* | 1/2010 | Dusang, Jr. | H02H 3/165 |
| | | | 361/47 |
| 2012/0113555 A1* | 5/2012 | Mousavi | H02H 3/40 |
| | | | 324/555 |
| 2013/0229735 A1* | 9/2013 | Rostron | G01R 31/08 |
| | | | 702/58 |
| 2020/0072894 A1* | 3/2020 | Montenegro | G01R 31/58 |
| 2021/0072303 A1* | 3/2021 | Aleman | H02H 1/0007 |
| 2022/0158435 A1* | 5/2022 | Tobin | H02H 1/0007 |

* cited by examiner

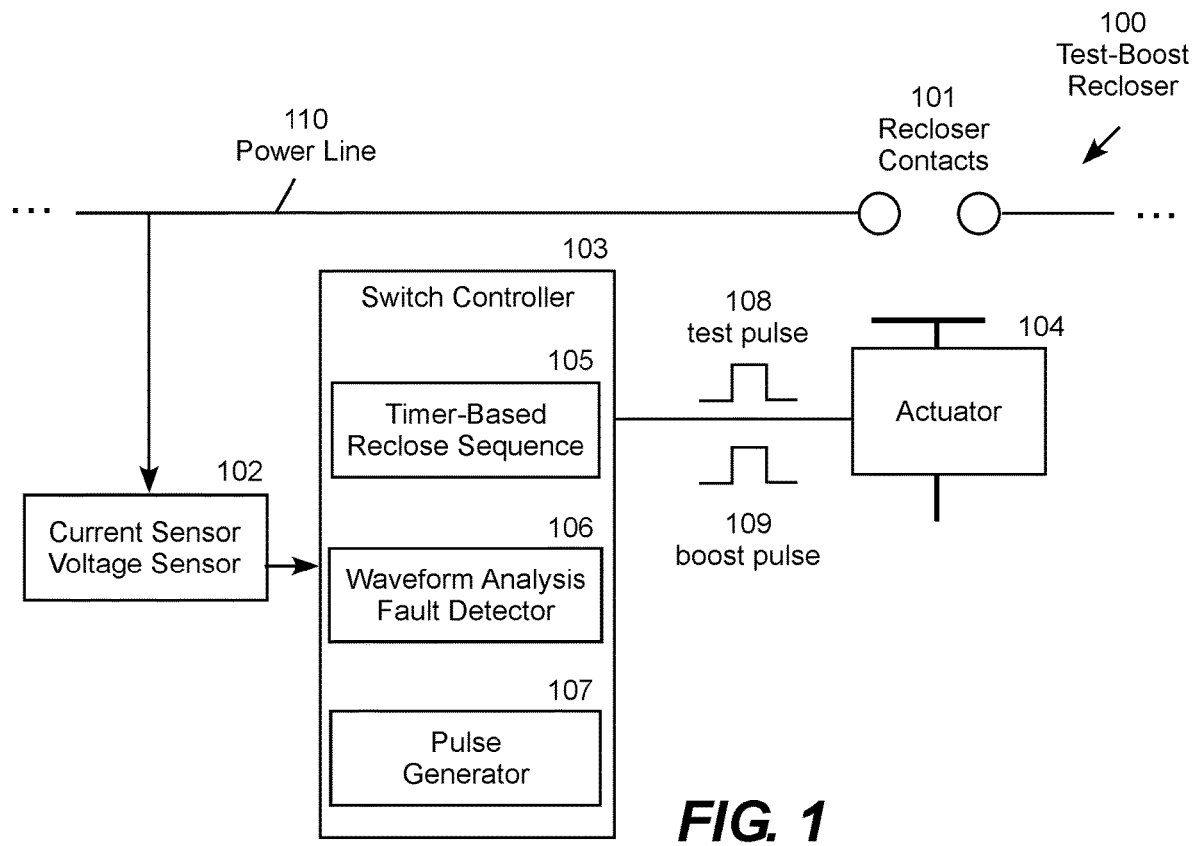
FIG. 1
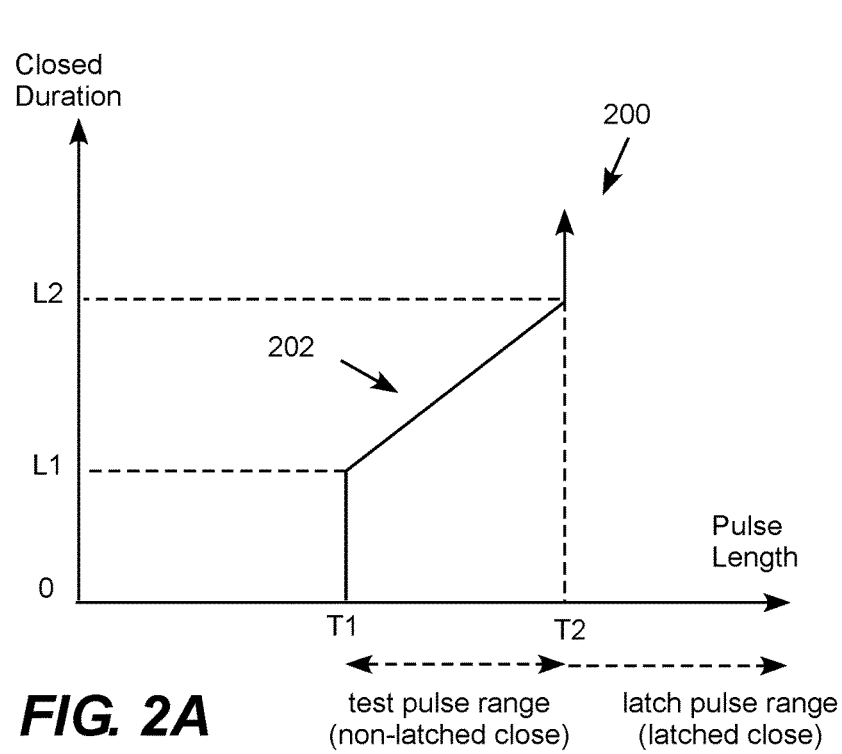
FIG. 2A
test pulse range (non-latched close)    latch pulse range (latched close)
|    | Ex-1   | Ex-2   |
|----|--------|--------|
| T1 | 46 ms  | 45 ms  |
| T2 | 49 ms  | 50 ms  |
| L1 | 4.5 ms | 4.0 ms |
| L2 | 6.5 ms | 7.0 ms |
FIG. 2B

TEST-BOOST ELECTRIC POWER RECLOSER

REFERENCE TO RELATED APPLICATION

This application claims priority to U.S. Provisional Pat. App. Ser. No. 63/224,448 filed Jul. 22, 2021, which is incorporated by reference.

TECHNICAL FIELD

The present invention is directed to electric power systems and, more particularly, to a test-boost electric power recloser that limits the duration of the test current imposed on the power line to less than two electric power cycles, and preferably less than one electric power cycle, when attempting to reclose into a fault.

BACKGROUND

Fault detection, isolation and service restoration (also referred to more compactly as "fault isolation" or "sectionalizing") is one of the most important tasks in electric power operations. Using automation to improve the reliability and operation of the transmission and distribution electric power grid is a top industry focus known as the "smart grid." Developing fast and reliable fault isolation systems that minimize the number of customers affected by power outages, and the duration of those outages, is one of the most important tasks in electric power automation and management. Conventional approaches for sectionalizing power circuits were designed for large, central-station power generation plants interconnected by a network of generally passive transmission and distribution lines to deliver the power downstream from the generating plants to the loads. The control schemes designed for this central-station paradigm are becoming increasingly unsatisfactory as electric transmission and distribution networks become increasingly active due to increasing penetration of distributed or load-side power generation resources, such as solar panels, wind turbines, fuel cells, battery storage, diesel generators, gasoline generators, and the like. Additional challenges arise for distributed generation resources connected to the power grid through electronic inverters, which lack the ability to generate high fault currents and stiff voltage characteristic of large spinning generators with high inertial mass.

Conventional distribution systems use automatic reclosers including circuit breakers and sectionalizers to isolate faults. After initially opening (generally referred to as "tripping"), most conventional reclosers automatically attempt to reclose one to five times over a period of several seconds according to a pre-set, timer-based reclose sequence to give the fault a chance to clear without further action. A fault can clear by itself, for example, when a lightning strike is over or when a tree branch falls away after momentarily causing a line fault. If the fault persists after the pre-set number of reclosing attempts, the recloser locks open requiring a manual reset once the fault has been cleared.

The U.S. electric power grid includes over five million miles of electric power distribution lines with several million reclosers operating at a range of voltages. Many of these reclosers are in remote locations and the vast majority are located on low-voltage distribution lines that are costly to patrol. These distribution systems serve a large number of electronic loads that can be damaged, knocked off-line, or forced to restart after a recloser operation. Moreover, an increasing number of distribution points serve load-side generation resources, such as solar panels, wind turbines, fuel cells, diesel generators, and the like connected to the power through electronic inverters. These distributed generators are often dropped from connection with electric power grid during recloser operations even though electric service to the loads is automatically restored within a few seconds. Dropping the distributed generators from a distribution circuit during recloser operations is problematic because it requires several minutes for the dropped generators to electronically synchronize and reconnect to the grid. Meanwhile, the inertial loads, such as air conditioners, typically remain connected to the same circuit and "ride through" the momentary power interruption caused by the recloser operation. As a result, the loads often remain connected to the distribution circuit following recloser operations while the distributed generators drop off-line, resulting in a circuit overload despite the otherwise successful power restoration. When the power supplied by the distributed generators is required to meet the connected load on the circuit, knocking the distributed generators off-line causes an overload tripping the circuit breaker resulting in a much wider outage. The resulting outage increases the number of affected customers, lengthens the outage, and complicates the power restoration process requiring staged reconnection of the distributed generators followed by reconnection of the loads.

The likelihood of damaging or knocking electric components off-line can be significantly reduced by reducing the duration of the fault current imposed on the power line during recloser operations, which is referred to as the "test current" occurring when the recloser initially closes during a recloser trial. If the fault has cleared, the test current is the normal non-faulted line current and the recloser remains closed. However, if the fault has not cleared (referred to as "closing into the fault"), the test current imposes the fault current on the power line for the period of time required for the recloser to detect the fault current and trip open (referred to as the "duration of the test current"). Since the recloser imposes the fault current on the power line for the duration of the test current when reclosing into a fault, minimizing the duration of the test current minimizes the likelihood of damaging or knocking electric components off-line when the recloser closes into the fault. The duration of the test current for a typical conventional recloser is about five electric power cycles (83 milliseconds). Many electric components can be damages or knocked off-line by a five-cycle recloser test current.

Significant effort has therefore been expended to develop techniques for reducing the duration of the test current during recloser operations. For example, U.S. Pat. No. 7,626,397 describes a method capable of reducing the recloser test current to about one-half an electric power cycle (about 8 milliseconds). This technique employs a pulse generator and a dual-actuator mechanism with two independent driving modules, each with a dedicated solenoid coil, one for closing and the other for tripping (opening) the recloser. By precisely controlling the two driving modules, the dual-actuator device can trip the switch as quickly as 8 milliseconds after reclosing by independently controlling the closing and tripping actuators for the individual phases in a sequence. The dual-actuator procedure significantly reduces the duration of the test current and, at the same time, detects whether the fault has cleared. This technique has a drawback, however, because it requires a dual-actuator mechanism including two solenoid coils, with a dedicated controlling scheme, which is complicated to implement and quite costly compared to a conventional recloser. This solution cannot be added to a conventional recloser through a software upgrade, therefore requiring acquisition of a new dual-action recloser, which significantly limits the number of location where this type of solution is economic feasible.

The electric power industry therefore has a continuing need for new and more effective, economic, reliable and safe smart grid techniques. More specifically, there is a continuing need for an electric power recloser that limits the duration of the test current imposed on the power line without requiring acquisition of a new dual-action recloser to separately control closing and tripping of the recloser.

SUMMARY

The present invention solves the problem described above through a test-boost electric power recloser that limits the duration of the test current imposed on the power line to less than two electric power cycles, and preferably less than one electric power cycle, when attempting to reclose into a fault. The test-boost recloser detects an electric fault flowing through the recloser contacts, trips the recloser contacts to interrupt the fault, and initiates a timer-based reclose sequence. Prior to the pre-set time for the timer-based reclose trial, the controller of the test-boost recloser sends a test pulse to the actuator causing a non-latching close of the recloser contacts causing a test current to flow through the recloser contacts. During the test current period, the controller determines through waveform analysis whether the fault has likely cleared. In response to determining the fault has not likely cleared, the controller continues the timer-based reclose sequence. In response to determining the fault has likely cleared, the controller sends a boost pulse to the actuator causing a latching close of the recloser contacts prior to the pre-set time for the timer-based reclose trial. The recloser may also perform iterative and feedback learning feedback processes to automatically improve its operation over time in response to measured fault and non-fault conditions and its success in predicting whether faults have cleared.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIG. 1 is a functional block diagram of a test-boost recloser.

FIG. 2A is contact closing curve for the test-boost recloser.

FIG. 2B is contact closing chart for the test-boost recloser.

DESCRIPTION OF ILLUSTRATIVE EMBODIMENTS

Figures 3A, 3B:
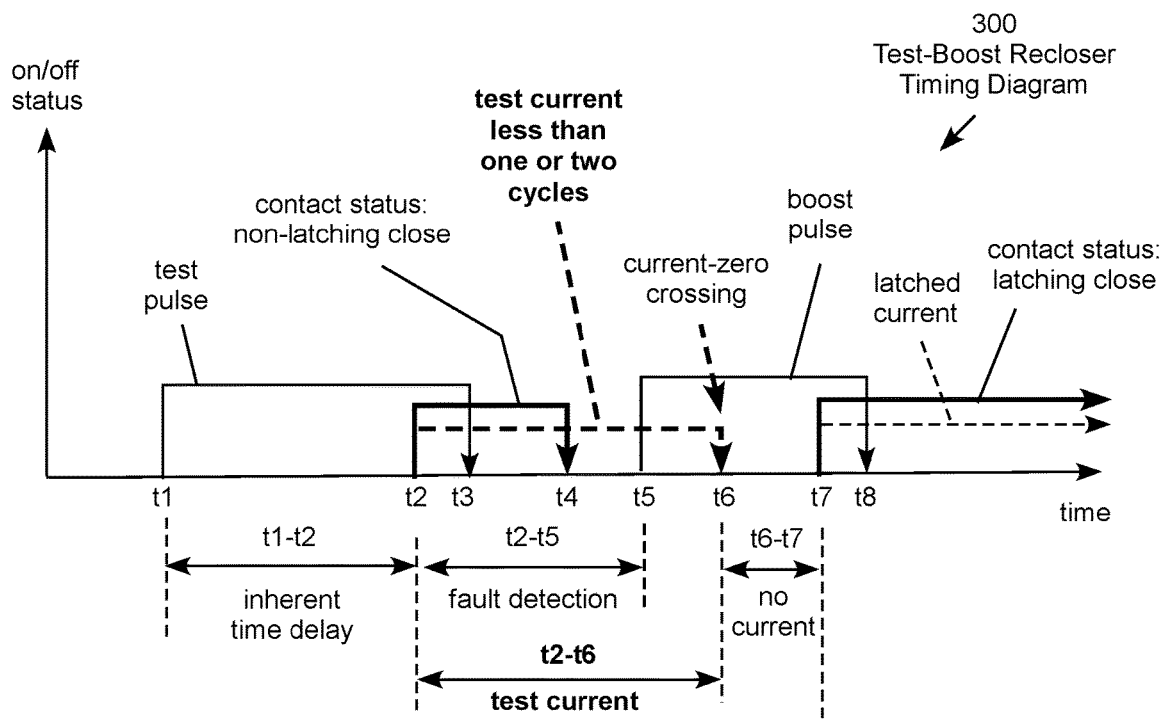
FIG. 3A is a timing diagram for the test-boost recloser.
FIG. 3B is a timing chart for the test-boost recloser.

Embodiments of the present invention include a test-boost electric power recloser that limits the duration of the test current imposed on the power line to less than two electric power cycles, and preferably less than one electric power cycle, when attempting to reclose into a fault. The test-boost recloser sends a test pulse causing a non-latching close followed by a boost pulse causing a latching close if waveform analysis based on the test close indicates that the fault has likely cleared. The test-boost approach can typically be implemented through a software and calibration upgrade to a conventional single-coil recloser, accomplishing results comparable to a dual-actuator recloser at a much lower cost.

Distribution circuits experience many temporary faults that can clear after the faulted circuit is initially deenergized. Therefore, circuit reclosers are widely used in distribution circuits where a recloser can automatically reclose back with a short time delay following a fault clearing trip. However, a fault may be permanent and or may last a little bit longer than the predefined delay time. So, a recloser may try a few times until the reclosing is either successful or reaches the allowed maximum number of reclosing trials. Each reclosing trial can extend the fault damage further while the fault still exists. It has been strongly desired in the industry for effective approaches to avoid or minimize such damage while closing to a fault during reclosing processes.

It is well understood that the extended fault damage can be reduced by either reducing the fault current or the fault duration, or both, during a reclosing trial. Extensive efforts have been paid to developing effective approaches to achieving one or both of these objectives. For example, a test closing can be performed by applying a reduced voltage or inserting an impedance into the circuit for reduced test current and then checking to see if the fault still exists before conducting a full reclosing. Unfortunately, most of these techniques are either too complicated or too costly for widespread implementation. Few installations of this type of solution can be economically justified in practice, although they may work fine technically. Great effort has also been paid to speeding up the switching operation mechanisms and relay protection processing. However, these efforts can only reduce the duration of the test current to the level of three electric power cycles (50 ms), and only with significant cost.

Instead of involving a complicated dual-actuator mechanism, the present invention develops an innovative calibration and control scheme that extends the use of the existing features of conventional reclosers to conduct a test-boost reclosing procedure that limits the duration of the test current when the recloser closes into a fault to less than two electric power cycles, and preferably less than one electric power cycle, when reclosing into a fault. This scheme is technically much easier to implement and economically superior to dual-actuator techniques. A conventional recloser uses a single actuator to drive for either closing or tripping. It takes tens of milliseconds to switch from one mode to another. To execute a closing action, it requires a sufficiently long pulse of control signal to ensure the circuit contacts become well closed and latched. If the pulse length is not sufficiently long, the contacts may not touch each other at all, or may touch momentarily without latching. The present invention properly modifies and fine tunes the recloser operation to make the length of momentary non-latching test close last for a desired duration for a given length of test pulse. The recloser precisely controls the duration of the test pulse to conduct a non-latching test close, in which the recloser contacts only close momentarily, long enough to generate a test current for waveform analysis, but not long enough to latch the switch closed. Test results show the test current can be reliably limited to less than two electric power cycles, and preferably less than one electric power cycle, which is sufficient to conduct waveform analysis to determine whether the fault has likely cleared.

A waveform analysis fault detector continuously monitors the circuit condition (e.g., only current, or current and voltage, as desired for a particular recloser) and determines whether the fault has likely cleared during the momentary, non-latching test close. If the fault detector determines the fault has likely not cleared, the contacts are allowed to fully open after the non-latching test close. If, on the other hand, the fault detector determines the fault has likely cleared, the switch controller sends a boost pulse to cause a latching close of the contacts. The control logic the resets the trip timer and returns to the timer-based reclosing scheme with the switch closed.

The waveform fault detection analysis may utilize multiple techniques to detect fault conditions, including checking rate of current change (di/dt) of the test current, phase shift analysis, and/or pattern comparison of the test current against the initial fault, pre-fault, and historical fault and non-fault current and voltage waveforms. The decision can be made based on a likelihood threshold, such as an 80% chance of fault clearing. This means that there may be a 20% chance of fully closing to the fault again, for which the conventional timer-based relay protection sequence will be activated and take at least three electric power cycles (50 ms) to clear the fault again. If the fault detector determines the fault has likely not cleared based on the waveform analysis, the control logic allows the reclosing scheme to continue with the switch open. In this case, the recloser will wait for the next recloser trip according to the predefined reclosing scheme to conduct another non-latching test close.

A test closing may be contaminated by transformer inrush in distribution circuits, which introduces fault detection difficulties with current waveform data less than a full cycle. The control logic is designed to pick up a closing time at that the voltage angle of the reference phase is 180 degrees off from the previous closing. This is based on the understanding that an inrush is more likely to occur when the transformers get flux residuals from previous energization. Changing the voltage polarity in test closing can effectively cancel the flux residuals. Phase shifts between the test current and the reference voltage, the pre-fault current, the pre-fault voltage, the post-fault current and/or the post-fault voltage can also indicate a fault versus non-fault condition based on fractional-cycle fault analysis. For example, phase shift analysis can often be used to distinguish a line-to-line or line-to-ground fault condition from a transformer, motor or capacitor inrush current or voltage transient. Other types of current and voltage waveform profiles may be used in the waveform fault detection analysis.

FIG. 1 is a functional block diagram of a representative embodiment of a test-boost recloser 100 connected to a three-phase electric transmission or distribution power line 110. A single line diagram is illustrated because each phase of the power line may operate independently in a similar manner. The recloser 100 includes a set of recloser contacts 101 and a current and voltage sensor 102, which may be implemented as a unitary device or as separate physical devices. U.S. Pat. Nos. 9,581,642; 10,481,186 and 10,698,010, which are incorporated by reference, describe examples of local current and voltage sensors. Although the test-boost functionality may be implemented with only current sensing, current and voltage sensing is illustrated in this example as the more general case. The recloser 100 also includes an actuator 104 that trips (opens) and closes an electrical connection across the contacts 101 to control electricity flowing on the power line 110. The actuator 104 and contacts 101 are depicted simplistically representing a variety of complex physical recloser configurations, such as vacuum and dielectric gas switches utilizing butt contacts, penetrating contacts, and other configuration known in the industry. See, for example, the vacuum switch utilizing butt contacts described in U.S. Pat. No. 10,242,825 and the dielectric gas switches utilizing penetrating contacts described in U.S. Pat. Nos. 7,078,643 and 8,063,333, which are incorporated by reference.

Generally, the switch controller 103 includes a microprocessor, a power supply, a memory storing computer-executable instructions, and other components and functionality of modern computer-implemented technology. Specific to the present invention, the switch controller 103 includes a timer-based reclosing sequence 105, a waveform analysis fault detector 106, and a pulse generator 107. The timer-based reclosing sequence 105 implements a conventional timer-based recloser sequence, while the waveform analysis fault detector 106 and the pulse generator 107 implement the innovative test-boost functionality of the present invention. The switch controller 103 implements the test-boost functionality following each trip of the recloser, which can occur during multiple recloser trials attempting to clear a fault on the power line 110. The waveform analysis fault detector 106 and pulse generator 107 can typically be added to a conventional timer-based recloser through a calibration and software upgrade, avoiding the need to acquire a new hardware switch to implement an embodiment of the invention.

Following an initial trip of the recloser due to a fault on the power line 110, and prior to an initial reclose of the timer-based recloser sequence, the switch controller 103 sends a test pulse 108 to the actuator 104, which causes a non-latching test close of the contacts 101 generating a test current less than two electric power cycles, and preferably less than one electric power cycle, in duration. The waveform analysis fault detector 106 analyzes the test current waveform to determine whether the fault has likely cleared (which is equivalent to saying the recloser most likely did not close into the fault), or whether the fault has likely not cleared (which is equivalent to saying the recloser most likely did close into the fault). If the actuator most likely closed into the fault, the switch controller 103 allows the non-latching close to fully open, which limits the duration of the test current to less than two electric power cycles, and preferably less than one electric power cycle, to limit the disturbance on the power line 110 caused by the momentary, non-latching test close of the contacts 101 when closing into the fault. The non-latching test close thus supplements the initial reclose of the timer-based reclose sequence with the non-latching test close much earlier in the recloser operating sequence. If the actuator most likely did not close into the fault, the switch controller 103 sends a boost pulse 109 to the actuator 104 causing a latching close of the contacts 101 before the initial reclose of the timer-based reclose sequence is set to occur. In this case, the test-boost latching close replaces the initial reclose of the timer-based reclose sequence. This test-boost procedure allows the recloser 100 to limit the duration of the test current during the non-latching test close of the contacts 101 to less than two electric power cycle (33 milliseconds at 60 Hz), and preferably less than one cycle (17 milliseconds at 60 Hz). The test-boost recloser 100 accomplishes the desired result by carefully controlling the calibration and operation of the single actuator 104 without requiring a costly dual-actuator mechanism to achieve a similar result.

A detailed explanation of the operation of the test-boost recloser 100 demonstrates the calibration and operation of the recloser 100 required to achieve the test-boost functionality. FIG. 2A is contact closing curve 200 for a representative test-boost recloser. In general, all reclosers demonstrate some variation of this functionality, which the test-boost recloser takes advantage of to achieve "non-latching close" and "latching close" operations. In any physical embodiment, there is an inherent time delay and duration difference between control pulses delivered to the actuator and the physical operation of the actuator resulting in initiation and cessation of the physical touching of the recloser contacts. There may also an inherent difference between the flow of electric current through the recloser contacts and the physical touching of the contacts due arcing between the contacts. To account for these differences, the horizontal axis illustrates time, while the vertical axis represent the on/off status of conditions occurring in the recloser. Referring to FIG. 2A, the latch curve 202 indicates that any control pulse with a duration between zero and T1 results in no closing of the contacts, while a control pulse in the range from T1 to T2 results in a non-latching close of the contacts of a duration between L1 and L2. In addition, any control pulse with a duration greater than T2 results in a latching close of the contacts greater than L2.

FIG. 2B is contact closing chart 210 for two conventional reclosers subjects to testing. The reclosers exhibit T1 in the rage of 45 ms to 46 ms, T2 in the range of 49 ms to 50 ms, L1 in the range of 4.0 ms to 4.5 ms, and L2 in the range of 6.5 ms to 7.0 ms. It is expected that the value of T1 can go down to about 30 ms and T2 can go down to about 40 ms for some types of switches. The range of performance is therefore expected to be sufficiently narrow to accommodate adding the test-boost functionality as a calibration and software upgrade to most conventional reclosers currently in operation.

FIG. 3A is a timing diagram 300 and FIG. 3B is a timing chart 304 for a representative test-boost recloser. The timing diagram 300 is not shown to scale to accommodate illustration of test pulses and switch contact status on the same time scale. As shown in the timing diagram 300, the switch controller delivers a test pulse during the time interval (t1-t3), which causes a non-latching close of the contacts during the time interval (t2-t4). Referring to FIGS. 2A-2B and FIG. 3B, the test pulse (t1-t3) has a duration between T1 and T2 for the particular switch to achieve the non-latching close. The time period (t1-t2) represents the inherent time delay between initiation of the test pulse and the initiation of the test current flow through the recloser contacts. The contacts remain physically closed during the non-latching time interval (t2-t4), which typically ends before the next ensuing electric current zero-crossing. However, the test current continues to flow until the current gets close to the next ensuing current zero-crossing (t6) following physical separation of the recloser contacts, when the test current is sure to extinguish.

The recloser is calibrated to initiate the test pulse (t1) so that the test current begins to flow (t2) near a current-zero crossing to obtain a nearly symmetrical current waveform with minimal arcing across the recloser contacts. The timing of the test pulse (t1) is typically based on a voltage maximum, as opposed to a current zero-crossing, since there is no current flowing through the recloser contacts when the decision to initiate the test pulse (t1) is made. Once the test current begins to flow (t2), the waveform analysis fault detector begins to analyze the current waveform, initially with fractional-cycle analysis, to determine whether the fault has likely cleared. If the waveform analysis fault detector determines the fault has likely not cleared (i.e., the recloser has likely closed into the fault), the recloser allows the switch to fully open following the non-latching close. This limits the test current imposed on the power line, in the event of closing into the fault, to less than two electric power cycles, and preferably less than one electric power cycle, to minimize the disturbance on electronic components connected to the power line when reclosing into the fault.

If the waveform analysis fault detector determines the fault has cleared (i.e., the recloser likely did not close into the fault), the recloser sends a boost pulse (t5-t8). After an inherent time delay, the boost pulse causes the actuator to reclose the contacts during a latching closed (t7 forward). Referring to FIGS. 2A-2B and FIG. 3B, the boost pulse (t5-t8) should have a duration greater than T2 for the particular switch to ensure a latching close of the recloser contacts. The time period (t5-t7) represents the inherent time delay between initiation of the boost pulse and the re-initiation of the current flow through the switch contacts for the latching close. The time period (t6-t7) represents a period of zero current flow through the recloser contacts, which can be typically be minimized to speed up the latching close.

It can be noticed from FIG. 3 that when a test pulse with a carefully selected length (t1-t3) is issued at (t1), the recloser contacts can close at (t2), at which time the circuit current waveform can be sampled for waveform analysis. If a likely fault clear condition can be confirmed based on a likelihood threshold before the current zero-crossing (t6), the pulse controller can send the boost pulse (t5-t8) with its length long enough for latching (>T2). A boost pulse can be initiated at any time after the end of the test pulse (t3), and could be initiated (t5) slightly after the current zero-crossing (t6) to accommodate fault detection analysis through the current zero-crossing (t6) and calibrate the desired timing of the contact closure (t7) for the latching close.

It should also be noted that the boost pulse (t5-t8) causes the recloser to reverse the course of an opening transition to a closing transition (see also FIGS. 6D and 6E), which is a recloser operation not performed by conventional reclosers. Switch testing has confirmed that a properly calibrated test-boost pulse sequence can reliably cause the reclose to perform the desired test-boost latching close without allowing the switch to fully open after the test pulse, which significantly shortens the reclosing time compared to conventional recloser operation. In addition, if the fault likely clear condition is not confirmed with the data collected before the end of the test current period (t6), this means that the non-latching test close did not result in a latching close during this recloser trial, the conventional timer-based reclose sequence continues, and a subsequent test-closing may be performed during the next ensuing recloser trial according to the conventional timer-based reclosing scheme. As shown in FIG. 3B, the test results indicate that the desired test-boost operation can be accomplished with a test current duration (t2-t6) easily within two electric power cycles, and preferably within one electric power cycle (i.e., within 12-13 ms for the tested reclosers).

Figure 4:
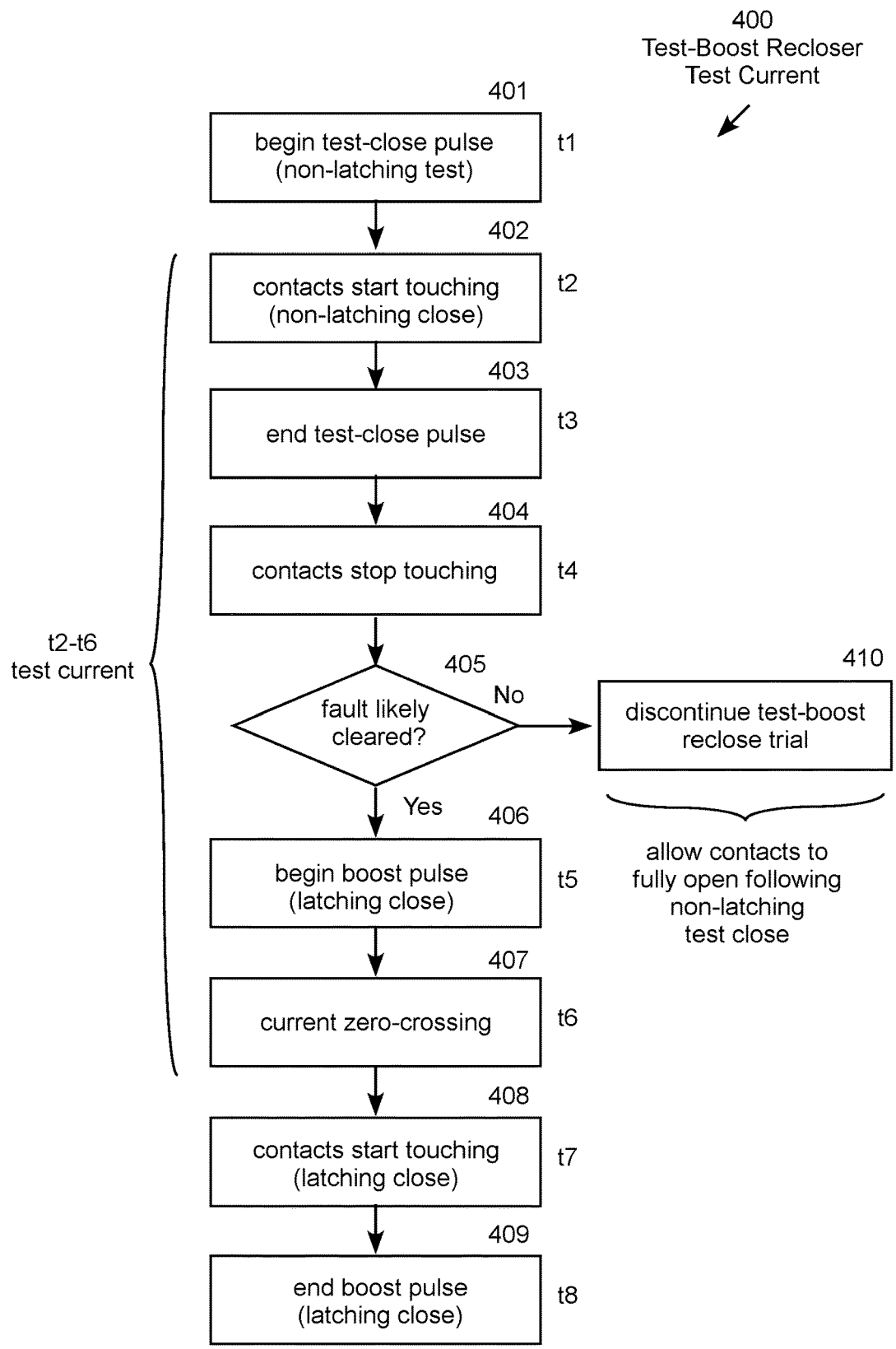
FIG. 4 is a logic flow diagram illustrating test current timing by the test-boost recloser.

FIG. 4 is a logic flow diagram 400 illustrating test current timing by the test-boost recloser, which refers to the times (t1 through t8) shown in the timing diagram 300 and timing chart 304 shown in FIGS. 3A and 3B. In step 401 (t1), the controller initiates the test pulse. Step 401 is followed by step 402 (t2), in which the contacts start conducting the test current for the non-latching test close. Step 402 is followed by step 403 (t3), in which the controller discontinues the test pulse. Step 403 is followed by step 404 (t4), in which the contacts stop physically touching, although the test current typically continues flowing through arcing between the contacts until the current gets close to a subsequent zero-crossing (t6). Step 404 is followed by step 405, in which the controller conducts waveform analysis fault detection to determine whether the fault has likely cleared, as described in more detail with reference to FIGS. 7-8 below. If the fault detector determines the fault has likely cleared (i.e., the recloser likely did not close into the fault), the "yes" branch is followed to Step 406 (t5), in which the controller initiates the boost pulse. Step 406 is followed by step 407 (t6), in which the test current gest close enough to the current zero-crossing to cause cessation of the current flow through the recloser contacts. Step 407 is followed by step 408 (t7), in which the recloser contacts begin conducting current for the latched close. Step 408 is followed by step 409 (t8), end test boost pulse (latching close). The contacts then remain closed and latched until the recloser is tripped again for a future fault.

Returning to step 405, if the fault detector determines the fault has likely not cleared (i.e., the recloser has likely closed into the fault), the "no" branch is followed to Step 410, in which the test-boost trial is discontinued and the switch is allowed to fully open after imposing the test current on the power line for less than two electric power cycles, and preferably less than one electric power cycle. This is the desired recloser operation, in which the switch either opens within one or two electric power cycles if it closes into the fault, or latches closed in response to a boost pulse if it does not close into the fault, prior to the pending reclose according to the conventional timer-based reclose sequence.

Figure 5:
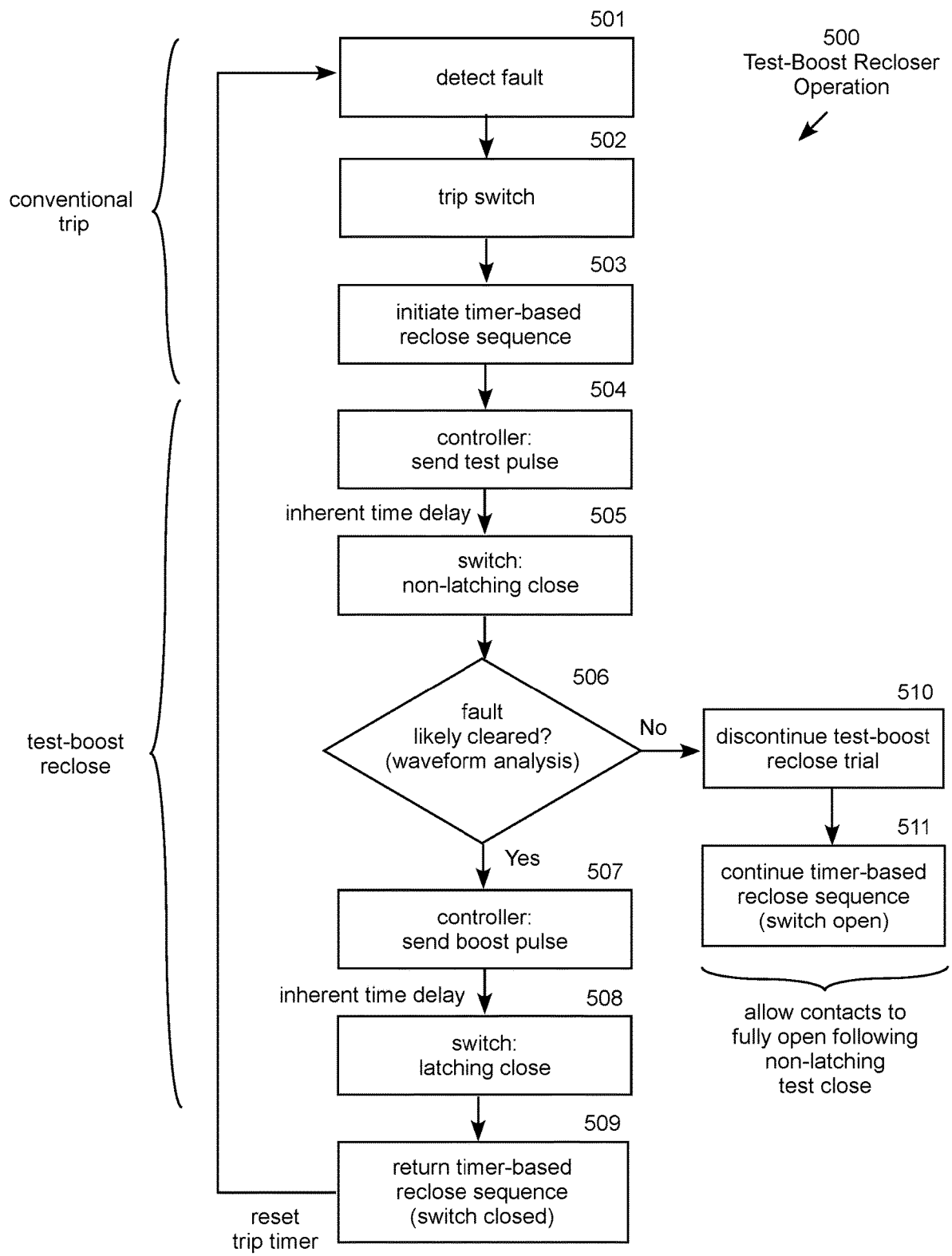
FIG. 5 is a logic flow diagram illustrating operation of the test-boost recloser.

FIG. 5 is a logic flow diagram 500 illustrating operation of the test-boost recloser including the initial trip starting the conventional timer-based recloser sequence. In step 501, the controller detects the fault. Step 501 is followed by step 502, in which the controller initially trips the switch. Step 502 is followed by step 503, in which the controller starts the conventional timer-based recloser sequence. Unlike conventional recloser operation, step 503 is followed by step 504, in which the controller sends the test pulse to the actuator. After a time delay inherent in the mechanical switch operation, step 504 is followed by step 505, in which the recloser contacts engage in a non-latching test close. This causes a test current to flow through the recloser contacts, which has a slightly different duration than the physical touching of the recloser contacts due to arcing between the contacts. Step 505 is followed by step 506, in which the controller conducts waveform analysis fault detection to determine whether the fault has likely cleared, as described in more detail with reference to FIGS. 7-8 below. Step 506 is followed by step 507, in which the fault detector determines whether the fault has likely cleared, typically based on a fault detection threshold, such as an 80% chance of fault clearing based on the waveform analysis fault clearing process. If the fault detector determines the fault has likely cleared (i.e., the recloser likely did not close into the fault), the "yes" branch is followed to Step 507, in which the controller initiates the boost pulse. Step 507 is followed by step 508, in which the recloser contacts begin conducting current for the latched close. Step 508 is followed by step 509, in which the test-boost recloser resets the trip timer and returns to the timer-based reclose mode at step 501 with the switch closed. The recloser then remains closed until it is tripped again for a future fault.

Returning to step 506, if the fault detector determines the fault has not likely cleared (i.e., the recloser likely closed into the fault), the "no" branch is followed to step 510, in which the controller does not issue a boost pulse, which allows the switch to fully open after imposing the test current on the power line for less than two electric power cycles, and preferably less than one electric power cycle. Step 510 is followed by step 511, in which the conventional timer-based reclose sequence continues with the switch open. The result is the desired recloser operation, in which the switch either opens after a test current within two electric power cycles, and preferably within one electric power cycle, if it closes into the fault, or latches closed in response to a boost pulse if it does not close into the fault.

Figure 6A:
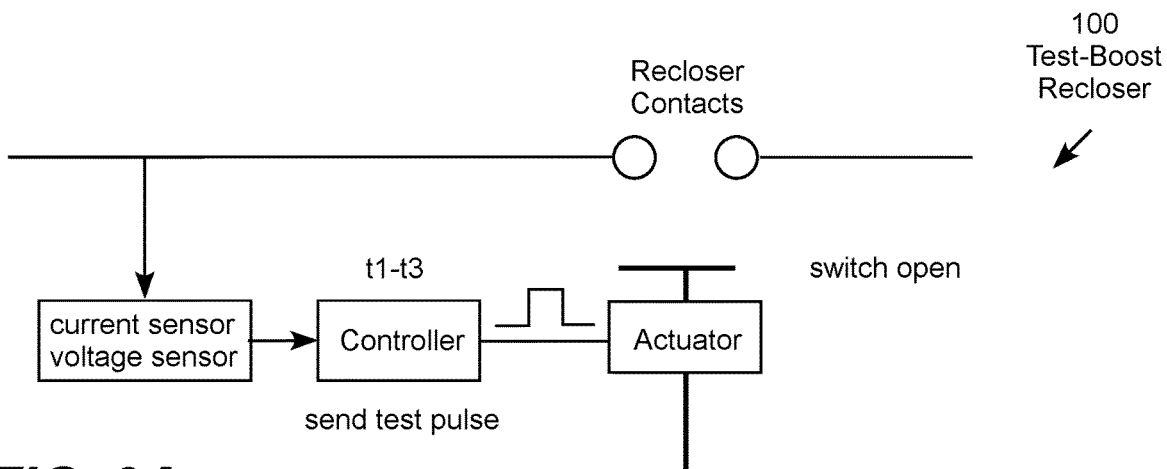
FIGS. 6A-6F are sequence diagrams illustrating operation of the test-boost recloser.
Figure 6B:
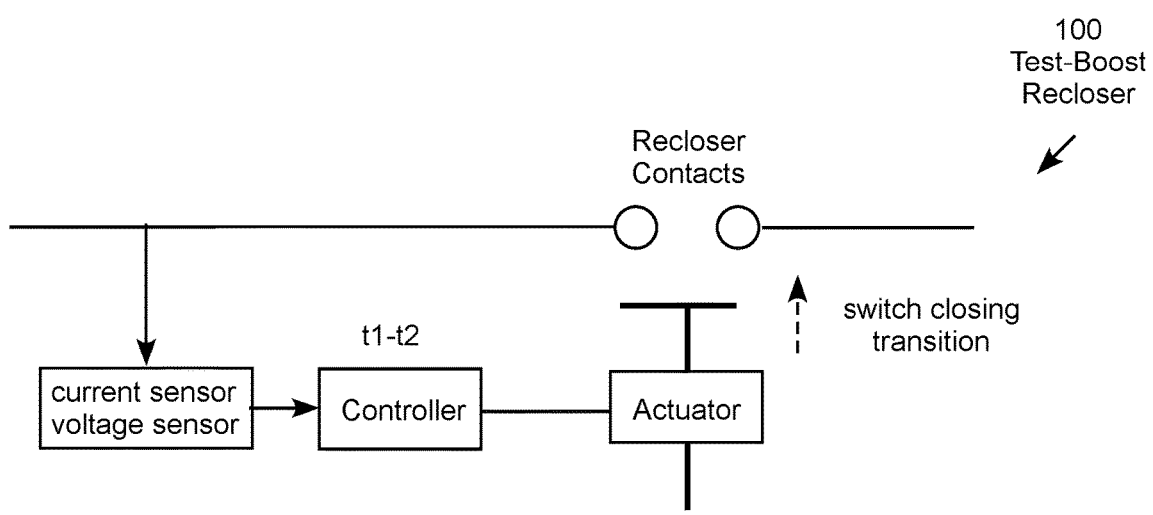
Figure 6C:
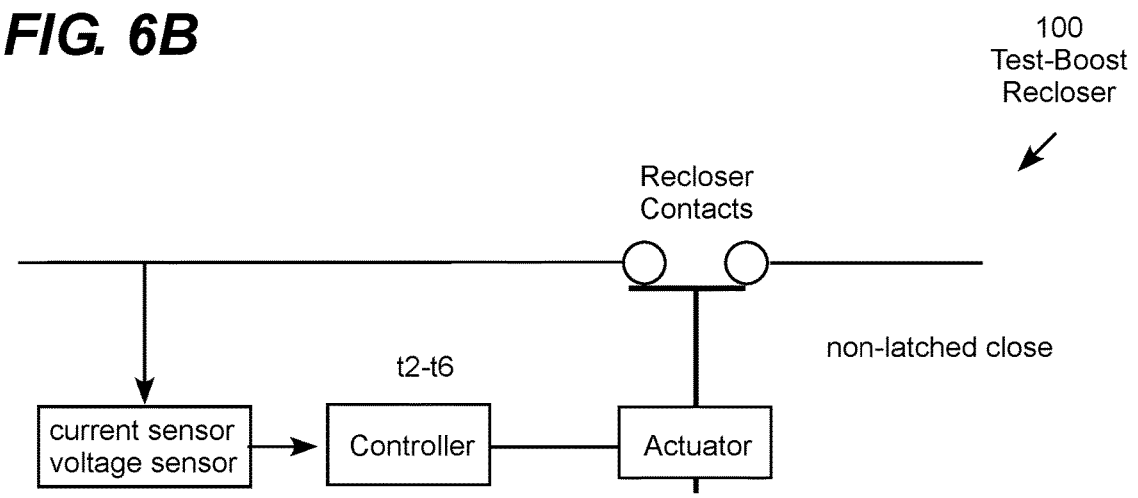
Figure 6D:
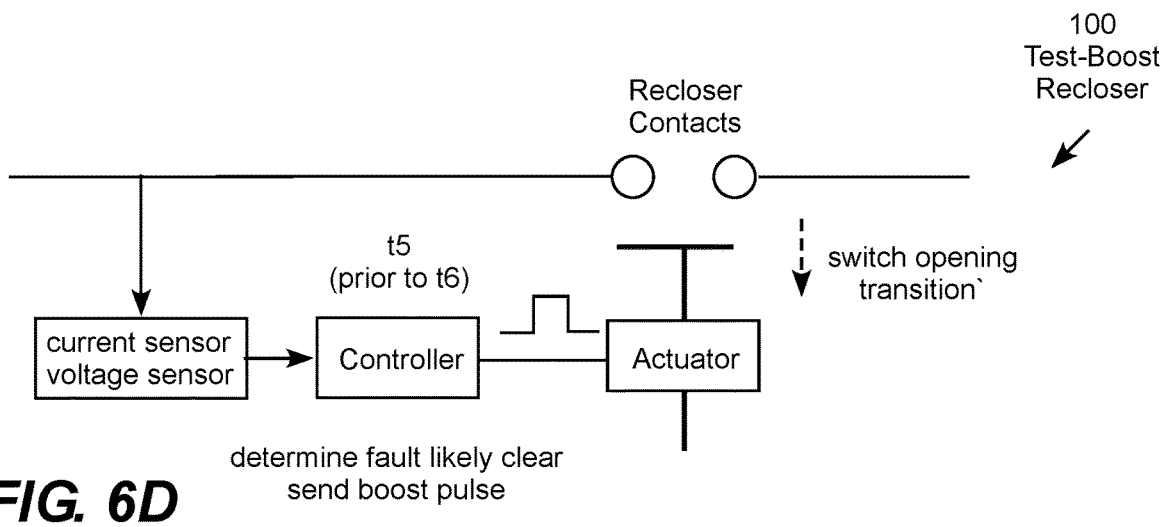
Figure 6E:
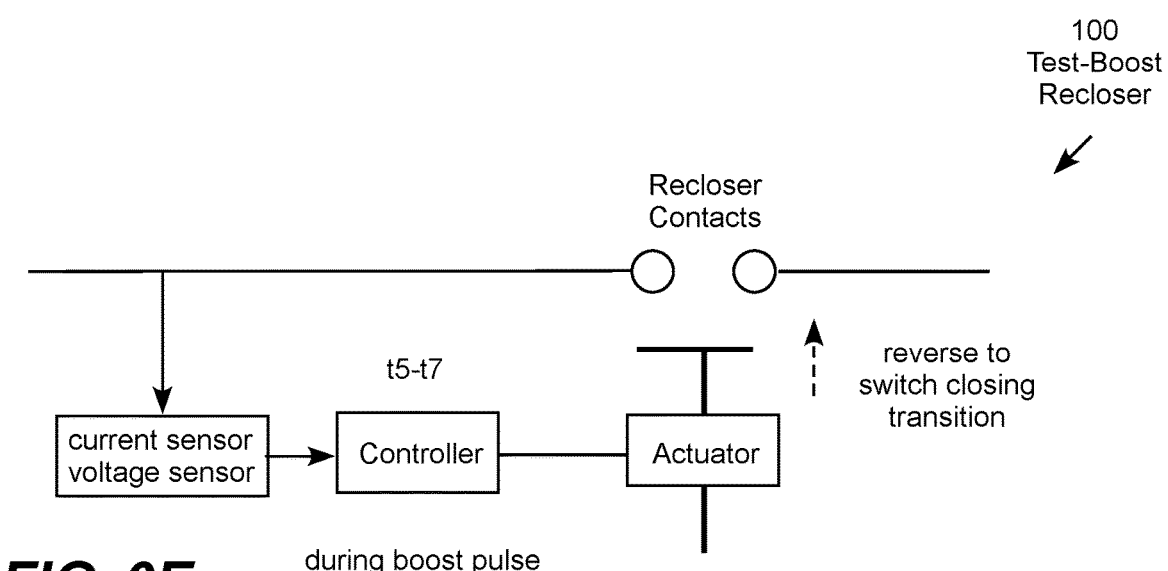
Figure 6F:
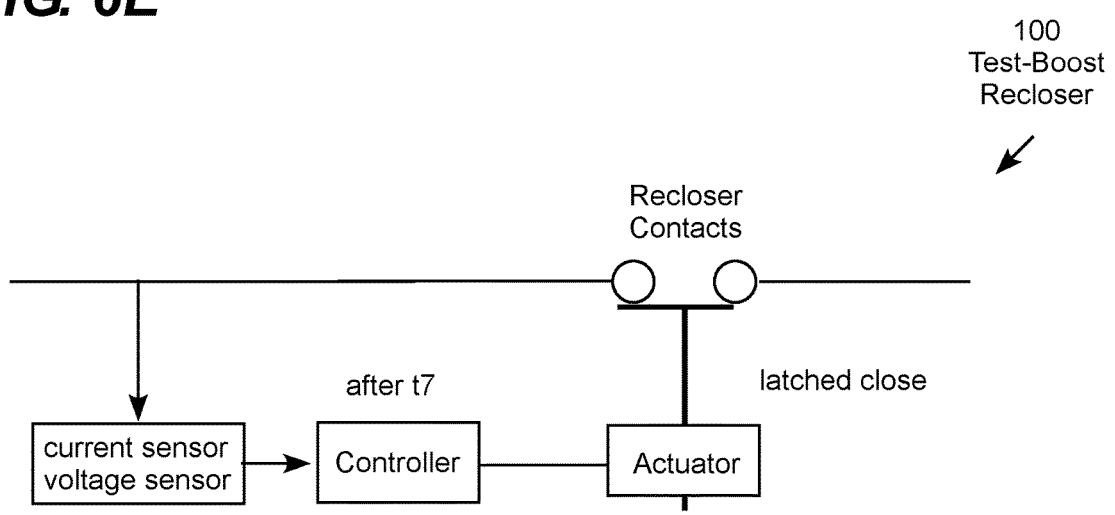

FIGS. 6A-6F are sequence diagrams illustrating operation of the test-boost recloser 100, which refer to the times (t1 through t8) shown in the timing diagram 300 and timing chart 304 shown in FIGS. 3A and 3B. FIG. 6A depicts the controller sending the test pulse (t1-t3) to the actuator. which begins with the switch in the open position shown in FIG. 6A (t1). FIG. 6B depicts the switch closing transition (t1-t2) from the open switch position to the closed switch position. FIG. 6C depicts the non-latched close (t2-t6). FIG. 6D depicts the determination of that the fault is likely clear and initiation of the boost pulse (t5-t7), which typically occurs while the switch is in the opening transition as shown in FIG. 6D. FIG. 6E illustrates the actuator reversing from the opening transition to the closing transition in response to the boost pulse, which is departure from conventional recloser operation. FIG. 6F illustrates the latched close of the switch in response to the boost pulse (t7 and forward).

Figure 7:
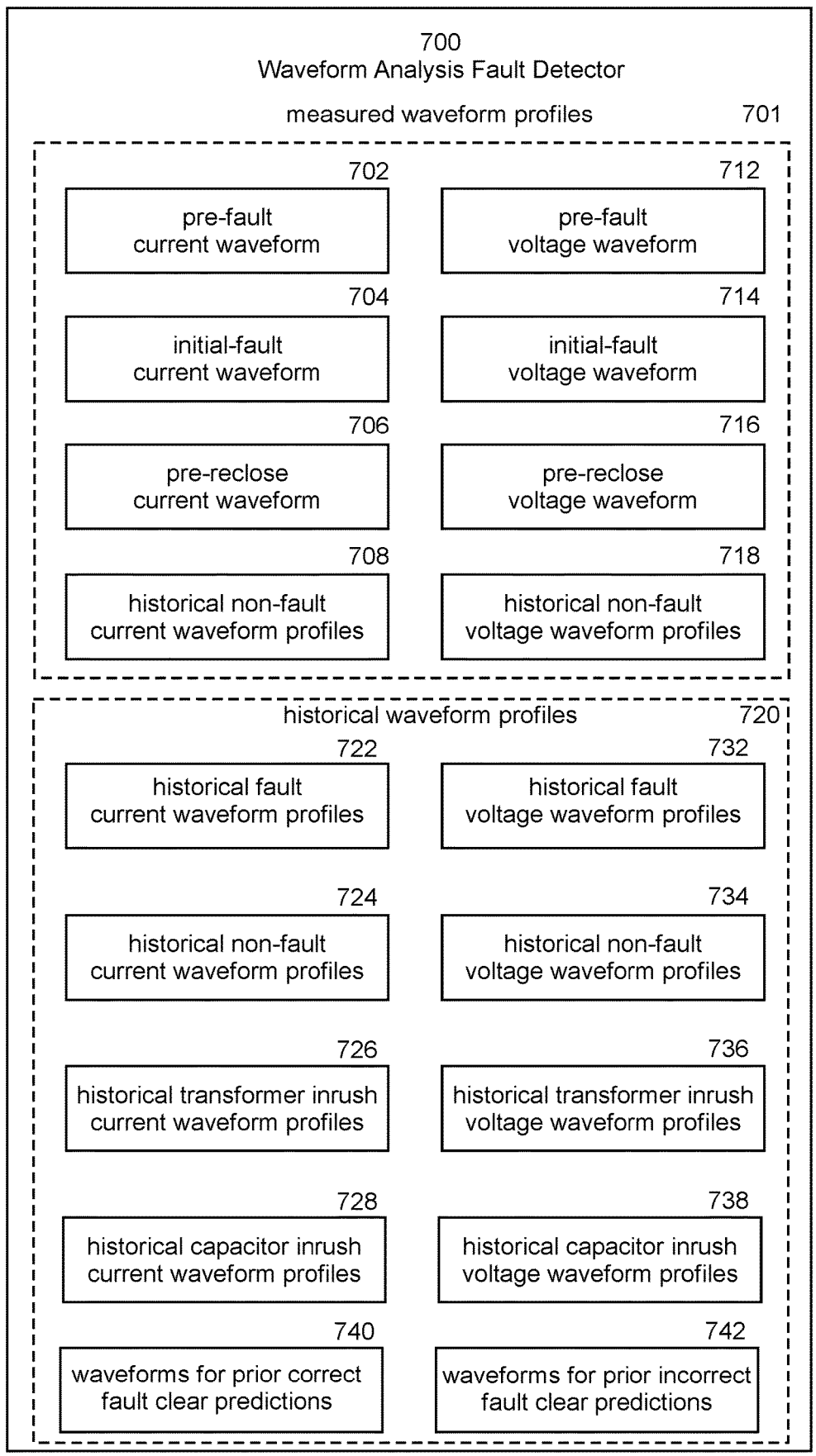
FIG. 7 is a block diagram illustrating stored waveform profiles for a waveform analysis fault detector.

FIG. 7 is a block diagram 700 illustrating measured waveform profiles in a waveform analysis fault detector 700, which typically relies on a variety of fault detection techniques, including rate of change of the electric current (di/dt) analysis, phase shift analysis, and pattern matching with known non-fault and fault current and voltage waveforms. To do so, the waveform analysis fault detector 700 stores and utilizes a number of measured waveform profiles 701 for the detected fault, as well as historical waveform profiles for past faults and non-fault conditions. The waveform analysis fault detector 700 conducts pattern matching between the measured current and voltage waveforms 701 and corresponding historical waveform profiles 720 to determine whether a fault has likely cleared.

Although the waveform analysis fault detector 700 may utilize only current waveforms, current and voltage waveform profiled are depicted to illustrate the more general case. In an illustrative embodiment, the measured waveform profiles 701 include a pre-fault current waveform 702 and a pre-fault voltage waveform 712 representing the current and voltage on the power line immediately before the detected fault. The measured waveform profiles 701 also include an initial-fault current waveform 704 and an initial-fault voltage waveform 714 representing the current and voltage on the power line immediately after the detected fault. For instances where the recloser has already attempted to reclose and reclosed into the fault, the measured waveform profiles 701 also include a post-close current waveform 706 and a post-close voltage waveform 716 representing the current and voltage on the power line immediately after previous reclosing trials of the recloser. The measured waveform profiles 701 also include historical non-fault current waveform profiles 708 and historical non-fault voltage waveform profiles 718.

The waveform analysis fault detector 700 also includes a number of historical waveform profiles 720 for past fault and non-fault conditions used for pattern matching with real-time measurements of the current and voltage on the power line immediately preceding and during recloser operations. In a representative embodiment, the historical waveform profiles 720 include historical fault current waveform profiles 722 and historical fault voltage waveform profiles 732 representing the current and voltage on the power line (and other power lines if desired) during past fault conditions. The historical waveform profiles 720 also include historical non-fault current waveform profiles 724 and historical non-fault voltage waveform profiles 734 representing the current and voltage on the power line (and other power lines if desired) during past non-fault conditions. The test-boost recloser thus learns from previous fault and non-fault conditions it has experienced.

It is also helpful to distinguish measured power line conditions from other common events involving high inrush currents and voltage transient conditions that are not fault related. For this example, these events include transformer and capacitor bank inrush, which can often be distinguished from fault inrush through phase shift and pattern analysis comparing current and voltage waveforms before and after faults to detect phase shifts and other waveform signatures characteristic of reclosing circuits serving transformers and capacitor banks. In a representative embodiment, the historical waveform profiles 720 therefore include historical transformer inrush current profiles 726 and historical transformer inrush voltage profiles 736 for the power line (and other power lines if desired). Similarly, the historical waveform profiles 720 include historical capacitor bank inrush current profiles 728 and historical capacitor bank inrush voltage profiles 738 for the power line (and other power lines if desired). The test-boost recloser thus learns from prior circuit conditions serving similar types of loads and load-side generation resources.

The historical waveform profiles 720 also include voltage and current waveform profiles for prior correct fault clear predictions 740, and voltage and current waveform profiles for prior incorrect fault clear predictions 742. The test-boost recloser thus learns from the success of its own experience predicting likely fault clear conditions.

Other types of historical waveforms may be included for the types of loads served by the particular recloser, such as heavy industrial motor loads, heavy air conditioning loads, heavy electronic loads, heavy distributed generation, on-peak waveform profiles, off-peak waveform profiles, weekday waveform profiles, weekend waveform profiles, seasonal waveform profiles, and so forth, as may be most relevant for the particular switch. The test-boost recloser thus learns from waveforms occurring during similar load and lost-side generation situations.

Figure 8:
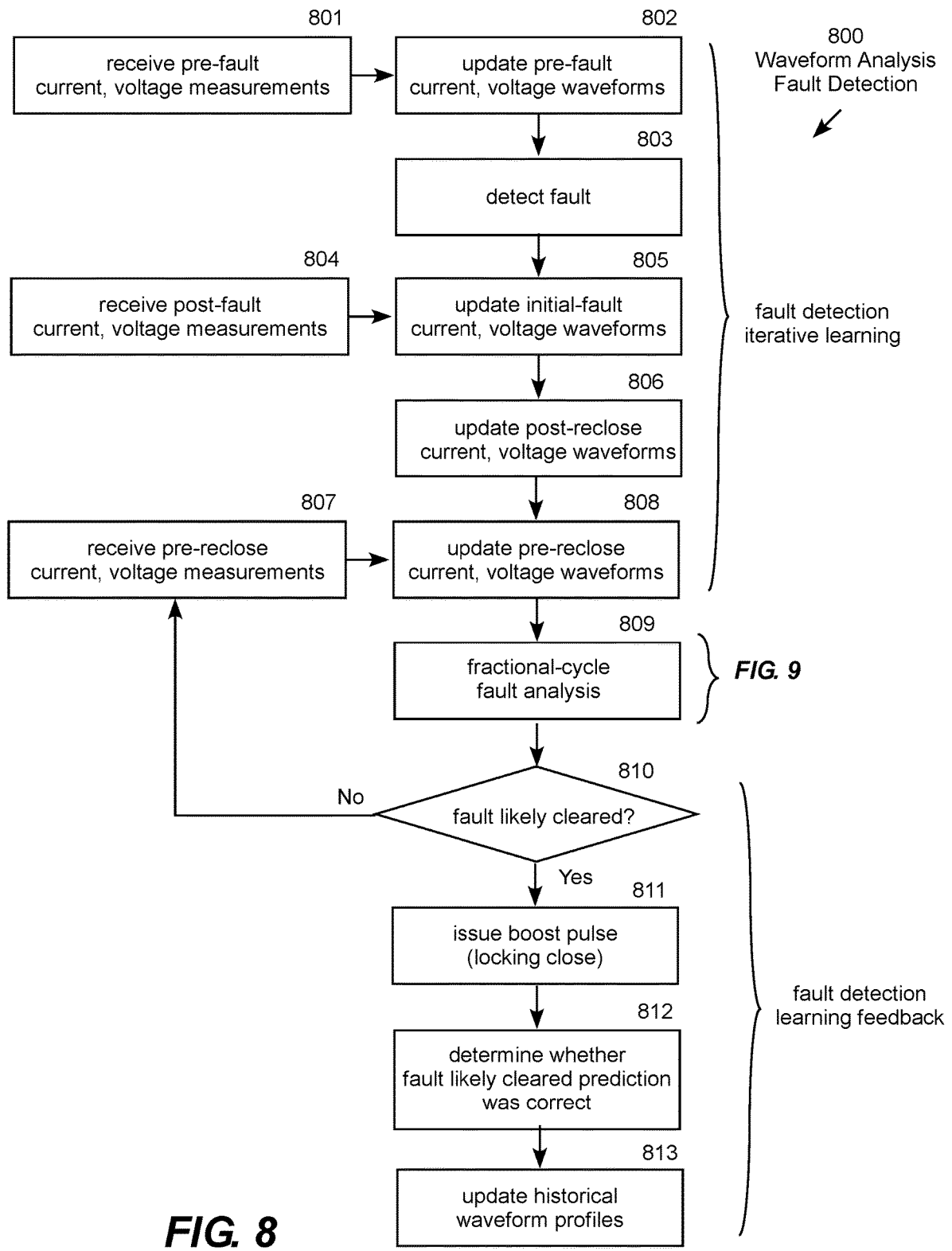
FIG. 8 is a logic flow diagram illustrating fault detection in the waveform analysis fault detector.
Figure 9:
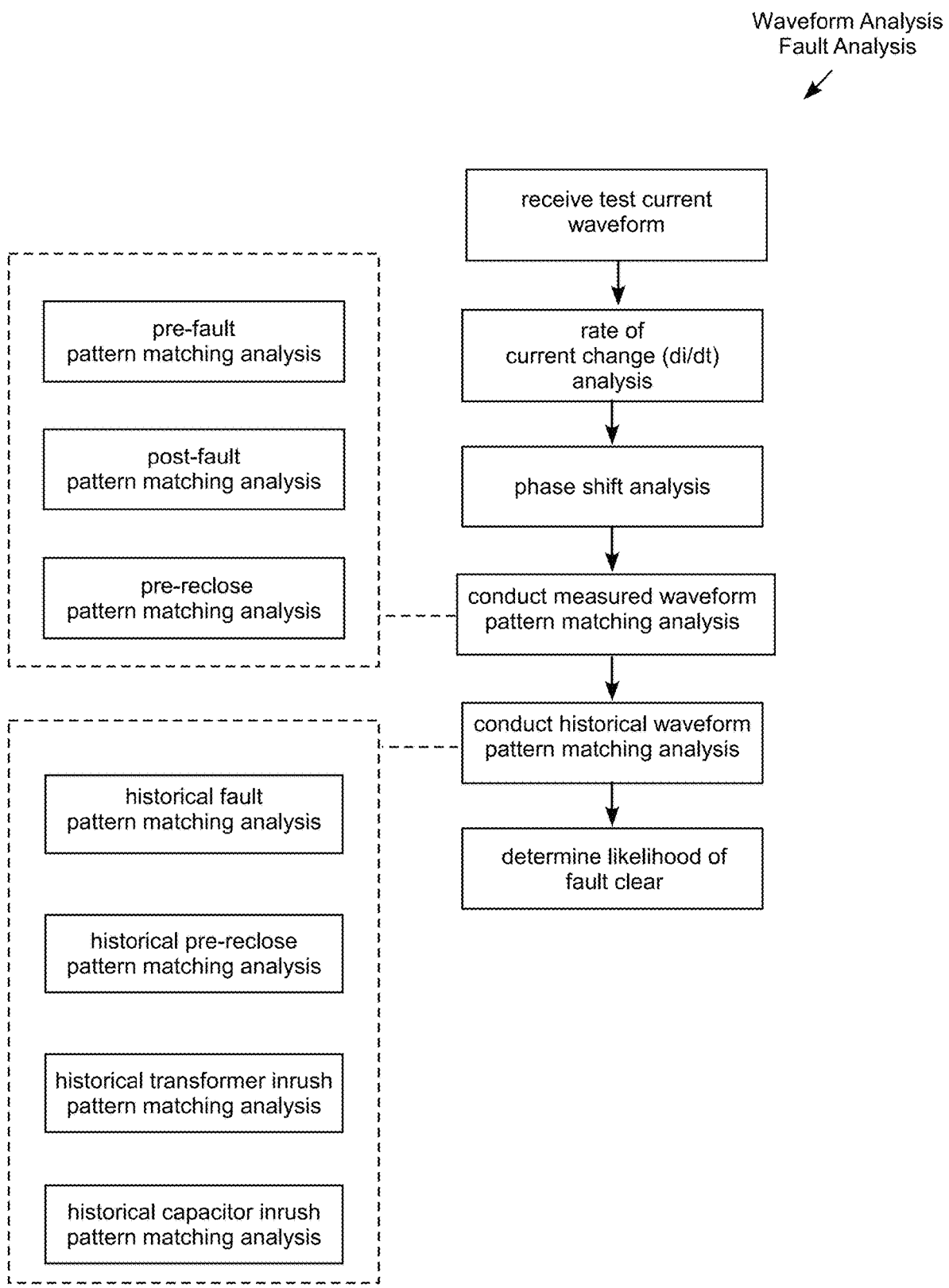
FIG. 9 is a logic flow diagram illustrating waveform analysis fault analysis.

FIG. 8 is a logic flow diagram 800 illustrating fault detection in the waveform analysis fault detector. In step 801, the fault detector receives pre-fault current and voltage measurements for the power line. Step 801 is followed by step 802, in which the fault detector updates the stored pre-fault current and voltage measurements to update the waveform files with the most recent measured data. Step 802 is followed by step 803, in which a fault is detected. Step 803 is followed by step 804, in which the fault detector receives post-fault current and voltage measurements for the power line. Step 804 is followed by step 805, in which the fault detector updates the stored post-fault current and voltage measurements to update the waveform files with the most recent measured data. Step 805 is followed by step 806, in which the fault detector receives post-reclose current and voltage measurements for the non-lathing test close. Step 806 is followed by step 807, in which the fault detector updates the stored post-reclose current and voltage measurements to update the waveform files with the most recent measured data. Steps 801 through 805 implement fault detection iterative learning as the fault detector continually updates its stored waveform files with measured data from the power line served by the recloser.

Step 807 is followed by step 808, in which the fault detector conducts waveform analysis fault detection for the test current during the non-latching test close. Step 808 is followed by step 809, in which the fault detector determines whether the fault has likely cleared based on the waveform analysis fault analysis of the test current. If the fault detector determines the fault has not likely cleared (i.e., the switch likely closed into the fault), the "no" branch is followed to step 810, in which the fault detector allows the switch to fully open after the test close. If the fault detector determines the fault has likely cleared (i.e., the switch likely did not close into the fault), the "yes" branch is followed to step 811, in which the controller sends a boost pulse to the actuator causing the switch to engage in a latching close. Step 811 is followed by step 812, in which the fault detector determines whether the fault likely cleared prediction was correct (i.e., whether the recloser trips again after the latching reclose). Step 812 is followed by step 813, in which the fault detector updates the historical waveform profiles to indicate a correct or incorrect fault clear prediction and the associated current and voltage waveforms, as the case may be for this particular reclose trial.

Steps 811 through 813 represent a fault likely cleared learning feedback process in which the fault detector predicts whether the fault has likely cleared, determines whether that prediction was correct, and then updates its historical waveform profiles to reflect the correct or incorrect fault clear prediction, as the case may be for this particular reclose trial. The fault likely clear prediction learning feedback process is a powerful tool allowing the fault detector to learn from its own experience in predicting whether faults have likely cleared by continually updating its stored waveform profile libraries including those reflecting correct and incorrect fault clear predictions. The test-boost switch can also engage in other types of self-learning processes, such as learning feedback concerning fault detection within very small test current time periods, for example down to a quarter of a cycle. As another example, the test-boost switch may use learning feedback to adjust the test pulse length for the non-latching close when the test pulse results in contacts not touching, or not touching long enough, or accidentally results in a latching close due to a too long test pulse.

In view of the foregoing, it will be appreciated that present invention provides significant improvements distribution automation system for high voltage electric power transmission and distribution systems. The foregoing relates only to the exemplary embodiments of the present invention, and numerous changes may be made therein without departing from the spirit and scope of the invention as defined by the following claims.

The invention claimed is:

1. An electric power recloser comprising recloser contacts, an actuator, and a switch controller comprising a non-transitory computer storage medium storing computer-executable instructions that, when executed by the switch controller, causes the switch controller to perform a method comprising:
   detecting an electric fault flowing through the recloser contacts;
   tripping the recloser contacts to interrupt the fault;
   initiating a timer-based reclose sequence comprising a pre-set time for a timer-based reclose trial;
   prior to the pre-set time for the timer-based reclose trial, sending a test pulse to the actuator causing a non-latching close of the recloser contacts causing a test current to flow through the recloser contacts during a test current period;
   during the test current period, determining through waveform analysis whether the fault has likely cleared;
   in response to determining the fault has likely not cleared, continuing the timer-based reclose sequence;
   in response to determining the fault has likely cleared, sending a boost pulse to the actuator causing a latching close of the recloser contacts prior to the pre-set time for the timer-based reclose trial;
   wherein the boost pulse reverses movement of the recloser contacts from an opening transition to a closing transition causing a latching close of the recloser contacts before the initial reclose of the timer-based reclose sequence is set to occur.

2. The electric power recloser of claim 1, wherein the test current period is less than two electric power cycles.

3. The electric power recloser of claim 1, wherein the test current period is less than one electric power cycle.

4. The electric power recloser of claim 1, further comprising, in response to determining the fault has likely cleared, resetting the timer-based reclose sequence.

5. The electric power recloser of claim 1, wherein determining the fault has likely cleared comprises pattern matching of a test current waveform to a plurality of historical current waveforms representing a variety of fault and non-fault circuit conditions previously experienced by the recloser.

6. The electric power recloser of claim 1, further comprising an iterative learning process continually updating stored waveform profiles based on measured fault and non-fault conditions experienced by the recloser.

7. The electric power recloser of claim 1, further comprising, in response to determining the fault has likely cleared:
   resetting the timer-based reclose sequence;
   storing a waveform profile indicating the incorrect fault likely cleared prediction.

8. The electric power recloser of claim 1, further comprising:
   computing a fault likely cleared prediction based on pattern matching comparing a test current waveform to a historical waveform profile;
   determining whether the fault was likely cleared prediction was correct;
   storing a waveform profile indicating whether the correct fault likely cleared prediction was correct.

9. The electric power recloser of claim 1, wherein the step of analyzing the test current comprises applying a rate of current change analysis to a test current waveform.

10. The electric power recloser of claim 1, wherein the step of analyzing the test current comprises applying a phase shift analysis to a test current waveform.

11. The electric power recloser of claim 1, wherein the step of analyzing the test current comprises applying a pattern matching analysis to a test current waveform.

12. The electric power recloser of claim 1, wherein the step of analyzing the test current comprises comparing a current waveform to a pre-fault current waveform.

13. The electric power recloser of claim 1, wherein the step of analyzing the test current comprises comparing a test current waveform to a post-fault current waveform.

14. The electric power recloser of claim 1, wherein the step of analyzing the test current comprises comparing a test current waveform to a post-reclose current waveform.

15. The electric power recloser of claim 1, wherein the step of analyzing the test current comprises comparing the test current to historical fault current waveform profiles.

16. The electric power recloser of claim 1, wherein the step of analyzing the test current comprises comparing the test current to historical non-fault current waveform profile.

17. The electric power recloser of claim 1, wherein the step of analyzing the test current comprises comparing the test current to historical transformer inrush current waveform profiles.

18. The electric power recloser of claim 1, wherein the step of analyzing the test current comprises comparing the test current to historical capacitor inrush current waveform profiles.

19. A method for operating an electric power recloser comprising recloser contacts, an actuator, and a switch controller comprising a non-transitory computer storage medium storing computer-executable instructions that, when executed by the switch controller, the method comprising:
   detecting an electric fault flowing through the recloser contacts;
   tripping the recloser contacts to interrupt the fault;
   initiating a timer-based reclose sequence comprising a pre-set time for a timer-based reclose trial;
   prior to the pre-set time for the timer-based reclose trial, sending a test pulse to the actuator causing a non-latching close of the recloser contacts causing a test current to flow through the recloser contacts during a test current period;
   during the test current period, determining through waveform analysis whether the fault has likely cleared;
   in response to determining the fault has likely not cleared, continuing the timer-based reclose sequence;
   in response to determining the fault has likely cleared, sending a boost pulse to the actuator causing a latching close of the recloser contacts prior to the pre-set time for the timer-based reclose trial;
   wherein the boost pulse reverses movement of the recloser contacts from an opening transition to a closing transition causing a latching close of the recloser contacts before the initial reclose of the timer-based reclose sequence is set to occur.

20. An electric power switch comprising:
   a recloser comprising recloser contacts;
   an actuator; and
   a switch controller comprising a non-transitory computer storage medium storing computer-executable instructions that, when executed by the switch controller, causes the switch controller to perform a method comprising:

detecting an electric fault flowing through the recloser contacts;

tripping the recloser contacts to interrupt the fault;

initiating a timer-based reclose sequence comprising a pre-set time for a timer-based reclose trial;

prior to the pre-set time for the timer-based reclose trial, sending a test pulse to the actuator causing a non-latching close of the recloser contacts causing a test current to flow through the recloser contacts during a test current period;

during the test current period, determining through waveform analysis whether the fault has likely cleared;

in response to determining the fault has likely not cleared, continuing the timer-based reclose sequence;

in response to determining the fault has likely cleared, sending a boost pulse to the actuator causing a latching close of the recloser contacts prior to the pre-set time for the timer-based reclose trial;

wherein the boost pulse reverses movement of the recloser contacts from an opening transition to a closing transition causing a latching close of the recloser contacts before the initial reclose of the timer-based reclose sequence is set to occur.

* * * * *